United States Patent [19]

Himes

[11] Patent Number: 4,892,903
[45] Date of Patent: Jan. 9, 1990

[54] ELASTOMERIC FIBERS, STRUCTURES FASHIONED THEREFROM AND ELASTOMERIC FILMS

[75] Inventor: Glenn R. Himes, Houston, Tex.

[73] Assignee: Shell Oil Company, Houston, Tex.

[21] Appl. No.: 87,477

[22] Filed: Aug. 20, 1987

Related U.S. Application Data

[63] Continuation-in-part of Ser. No. 882,986, Jul. 7, 1986, abandoned.

[51] Int. Cl.$^4$ .................. C08L 25/04; C08L 25/16; C08L 53/02; C08L 91/08
[52] U.S. Cl. .................. 524/488; 524/487; 524/489; 524/505; 525/89; 525/95; 525/98
[58] Field of Search .............. 524/505, 487, 488, 489; 525/89, 98, 95

[56] References Cited

U.S. PATENT DOCUMENTS 4,582,871 4/1986 Noro et al. .................. 524/505
4,716,183 12/1987 Gamarra et al. .................. 524/505

*Primary Examiner*—Allan M. Lieberman

[57] ABSTRACT

An elastic fiber or film prepared from a composition comprising at least one block copolymer containing at least two polymeric blocks containing predominantly monoalkenyl aromatic hydrocarbon monomer units having a weight-average molecular weight within the range from about 4,000 to about 50,000 and at least one polymeric block containing predominantly hydrogenated conjugated diolefin monomer units having a weight-average molecular weight within the range from about 10,000 to about 200,000, a relatively low molecular weight polymer selected from the Group consisting of anionic styrene homopolymers, α-methylstyrene homopolymers, hydrogenated styrene, copolymers of α-methylstyrene and styrene and mixtures thereof and may contain a wax. In particularly preferred embodiments, the elastic fiber or film will contain at least one A-B-A triblock copolymer and an A-B' diblock copolymer. In even more preferred embodiments, the elastic fibers or films will contain at least two A-B-A triblock copolymers and at least one A-B' diblock copolymer. In the even more preferred embodiments, the first of the A-B-A triblock copolymers will have A polymeric blocks having a weight-average molecular weight within the range from about 5,000 to about 9,000 and B polymeric blocks having weight-average molecular weights within the range from about 30,000 to about 50,000 and the second of the A-B-A triblock copolymers will have A polymeric blocks having weight-average molecular weights within the range from about 4,000 to about 7,000 and B polymeric blocks having weight-average molecular weights within the range from about 55,000 to about 90,000. The A-B' diblock will, in these even more preferred embodiments, have A polymeric blocks having weight-average molecular weights within the range from about 4,000 to about 9,000 and B' polymeric blocks having a weight-average molecular weight within the range from about 13,750 to about 67,500. The elastic fibers may be prepared using any of the methods known in the prior art including melt blowing. The elastic films may be used to prepare elastic articles of manufacture. The fibers and films may be used immediately or directly after preparation in the production of the desired product or products.

47 Claims, No Drawings

ELASTOMERIC FIBERS, STRUCTURES FASHIONED THEREFROM AND ELASTOMERIC FILMS

This is a Continuation-in-Part of U.S. patent application Ser. No. 882,986, filed July 7, 1986, now abandoned.

FIELD OF THE INVENTION

This invention relates to polymeric fibers, to structures fashioned therewith and to polymeric films. More particularly, this invention relates to elastomeric polymer fibers, to nonwoven fabrics and webs prepared therewith and to elastomeric polymer films.

BACKGROUND OF THE INVENTION

Nonwoven webs containing various polymeric fibers are, of course, well known in the prior art. Processes for preparing nonwoven mats from thermoplastic fibers have been described in such publications as Naval Research Laboratory Report No. 111437, which publication was submitted April 15, 1954; NRL Report 5265, which report is dated February 11, 1959 and in an article appearing in Industrial and Engineering Chemistry, Vol. 48, No. 8 (1956), pp. 1,342–1,346. Such processes are also described in U.S. Pat. Nos. 2,374,540; 2,411,659; 2,411,660; 2,437,363 and 3,532,800. Still other methods for preparing the same or similar nonwoven webs are described in British Pat. Nos. 1,055,187 and 1,215,537 and in U.S. Pat. Nos. 3,379,811 and 3,502,763. A method for preparing nonwoven webs from elastomeric fibers by spray spinning a rubber solution is described in U.S. Pat. No. 2,950,752. Methods for preparing nonwoven fabrics and/or nonwoven webs from elastomeric fibers by melt blowing an elastomeric composition are described in U.S. Pat. Nos. 4,323,534 and 4,355,425. As indicated at least in U.S. Pat. No. 4,323,534, from 20 wt % to 50 wt % of a fatty acid or fatty alcohol must be incorporated into the elastomer composition to prevent melt fracture of the elastomer during processing. Similarly, polymeric films are well known in the prior art.

As is also well known in the prior art, elastomeric fibers and nonwoven fabrics and webs prepared therewith as well as elastomeric films have potential utility in a broad range of applications. For example, it has been proposed to use elastic fibers in elastic bands for clothing and to use nonwoven structures prepared therewith in the preparation of disposable and semidisposable garments and in elastic bandages and wrappings. Moreover, it has been proposed to use elastic films in such applications as back sheets for diapers, elastic closures, shower caps and in similar applications where elastic properties would be particularly desirable. As is further well known, preparation of such fibers and films using extrusion techniques and particularly melt blowing techniques would be most desirable since these techniques are, generally, most economical, safer and, generally, can be easily controlled, thereby ensuring consistent production. The methods heretofore proposed, however, for preparing elastomeric fibers and films using extrusion technology have not been completely successful since these techniques generally require the inclusion of one or more materials which must subsequently be separated from the fibers or films thus produced. Such separation is, of course, generally, difficult to accomplish. The need, then, for a composition which can be extruded into an elastic fiber or film which can then be used directly in the preparation of nonwoven fabrics and/or nonwoven webs and/or used directly in the preparation of disposable or semi-disposable articles of manufacture is believed to be readily apparent.

SUMMARY OF THE INVENTION

It has now been discovered that the foregoing and other disadvantages of the prior art elastic polymeric fibers and films can be avoided, or at least reduced, with the elastic polymeric fibers and films of this invention and non-woven structures and elastic articles of manufacture prepared therewith. It is, therefore, an object of this invention to provide an improved elastomeric polymer fiber. It is another object of this invention to provide an improved elastomeric polymer film. It is still another object of this invention to provide such an elastomeric polymer fiber which can be used directly in the preparation of nonwoven structures. It is yet another object of this invention to provide an improved elastomeric polymer film which may be used directly in the manufacture of elastic articles of manufacture. The foregoing and still other objects and advantages of the present invention will become apparent from the description set forth hereinafter and the Examples included herein.

In accordance with the present invention, the foregoing and other objects and advantages are accomplished with a fiber or film prepared from a polymeric composition comprising at least one elastomeric block copolymer comprising at least two polymeric blocks containing predominantly monoalkenyl aromatic hydrocarbon monomer units and at least one polymeric block containing predominantly hydrogenated conjugated diolefin monomer units and a relatively low molecular weight polymer selected from the Group consisting of anionic polystyrene, α-methylstyrene homopolymers, hydrogenated polystyrene and α-methylstyrene-styrene copolymers and mixtures thereof. In general, the polymeric composition will contain from about 5 parts to about 50 parts, by weight, of the relatively low molecular weight polymer per 100 parts, by weight, of block copolymer. It is important to the present invention that the block copolymer be selectively hydrogenated to saturate at least about 80% of the ethylenic unsaturation remaining in the polymer after its preparation. It is also important to the present invention that the relatively low molecular weight polymer have a weight-average molecular weight within the range from about 1,000 to about 17,000. The polymeric composition useful for preparing the elastomeric fibers and films of this invention may also comprise from about 0 parts to about 50 parts, by weight, of a wax per 100 parts, by weight, of block copolymer. The polymeric composition useful for preparing the elastic fibers and films of this invention may also comprise one or more block copolymers comprising a single polymeric block containing predominantly monoalkenyl aromatic hydrocarbon monomer units and a single polymeric block containing predominantly conjugated diolefin monomer units. The polymeric composition useful for preparing the elastomeric fibers and films of this invention may also comprise other materials such as fillers, extender oils, stabilizers, pigments, lubricants, flow-improver resins, resin tackifiers and the like.

DETAILED DESCRIPTION OF THE INVENTION

As indicated supra, the present invention relates to elastomeric fibers and films which can be used directly; i.e., without subsequent treatment to separate an incompatible component therefrom, in the preparation of various nonwoven structures and/or elastic articles of manufacture. The elastomeric fibers and films can be prepared using any of the methods known in the prior art including extrusion techniques. The nonwoven structures may also be prepared using any of the techniques known in the prior art such as those associated with spun-bonding, melt blowing, melt spinning, spunlacing and the like. The polymeric composition used to prepare the elastomeric fibers and films of this invention will comprise at least one block copolymer having at least two polymeric blocks containing predominantly monoalkenyl aromatic hydrocarbon monomer units and at least one polymeric block containing predominantly conjugated diolefin monomer units, which conjugated diolefin monomer units are subsequently hydrogenated. The polymeric composition useful for preparing the elastic fibers and films of this invention may also comprise one or more block copolymers comprising a single polymeric block containing predominantly monoalkenyl aromatic hydrocarbon monomer units and a single polymeric block containing predominantly conjugated diolefin monomer units which are subsequently hydrogenated. As used herein in connection with the structure of the block copolymer, the recitation "predominantly" is intended to mean that the polymeric block will contain at least 85 wt % of the specified monomer but leave open the option of incorporating other copolymerizible monomers including monomers that may be contained in other polymeric blocks within the block copolymer. The polymeric composition used to prepare the elastomeric fibers and films of this invention will also comprise a relatively low molecular weight polymer selected from the Group consisting of anionic polystyrene, α-methylstyrene, hydrogenated polystyrene, copolymers of α-methylstyrene and styrene and mixtures thereof. In general, the weight-average molecular weight of the relatively low molecular weight polymer will be within the range from about 1,000 to 17,000. The polymeric composition used to prepare the elastomeric fibers and films of this invention may also comprise a wax. The polymeric composition useful in preparing the elastomeric fibers and films of this invention may also contain other components such as fillers, extender oils, stabilizers, pigments, lubricants, resin flow improvers, resin tackifiers and the like.

In general, any of the elastomeric block copolymers comprising at least one polymeric block containing predominantly monoalkenyl aromatic hydrocarbon monomer units and at least one polymeric block containing predominantly conjugated diolefin units known in the prior art may be selectively hydrogenated and used in preparing the elastomeric fibers and films of this invention. Suitable block copolymers which may be hydrogenated and used in preparing the elastomeric fiber of this invention, then, include those described in U.S. Pat. Nos. 3,231,635; 3,265,765 and 3,322,856. In general, suitable block copolymers may be represented by the general formula:

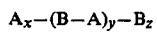

$$A_x-(B-A)_y-B_z$$

wherein A is a polymeric block comprising predominantly monoalkenyl aromatic hydrocarbon monomer units; B is a polymeric block comprising predominantly hydrogenated conjugated diolefin monomer units; x and z are, independently, a number equal to 0 or 1 and y is a whole number from 1 to about 25. In general, the monoalkenyl aromatic hydrocarbon monomer used in the preparation of polymeric block A may be any of the monoalkenyl aromatic hydrocarbon monomers known in the prior art. Suitable monoalkenyl aromatic hydrocarbon monomers, then, include styrene, alkyl-substituted styrenes, alkoxy-substituted styrenes, vinyl napthalene, vinyl toluene and the like. In general, any of the conjugated diolefins known in the prior art may be used either alone or in combination to prepare polymeric block B. Suitable conjugated diolefins, then, include conjugated diolefins having from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. In general, each A polymeric block of block copolymers useful in preparing the elastic fibers and films of this invention may have the same or a different weight-average molecular weight within the range from about 4,000 to about 50,000 and each B polymeric block in block copolymers having at least two blocks containing predominantly monoalkenyl aromatic hydrocarbon monomer units, may have the same or a different weight-average molecular weight within the range from about 10,000 to about 200,000, while the B polymeric blocks, which are hereinafter referred to as B' polymeric blocks, in polymers containing a single polymeric block containing predominantly monoalkenyl aromatic hydrocarbon monomer units may have the same or a different weight-average molecular weight within the range from about 2,500 to about 150,000.

The block copolymers useful in preparing the elastic fibers and films of this invention may be hydrogenated using any of the techniques known in the prior art to be suitable for such hydrogenation. In general, the hydrogenation conditions employed will be selected so as to ensure that at least 80% and preferably at least 95% of the ethylenic unsaturation in the conjugated diolefin polymer blocks after preparation of the polymer will be hydrogenated. The hydrogenation conditions will also be selected so as to ensure that less than about 20%, preferably less that 10% and most preferably less than 5% of the aromatic unsaturation is hydrogenated.

In general, satisfactory methods for selectively hydrogenating the block copolymers useful in preparing the elastic fibers and films of this invention involve the use of a suitable catalyst or catalyst precursor, particularly a catalyst or catalyst precursor comprising a Group VI or Group VIII metal atom. Suitable catalysts and methods for hydrogenating such block polymers are described in U.K. patent specification No. 1,030,306, the disclosure of which patent specification is hereby incorporated by reference, and in U.S. Pat. No. 3,700,633, the disclosure of which patent is hereby incorporated by reference. The process taught in U.S. Pat. No. 3,700,633 is particularly preferred for hydrogenating the block copolymers useful in preparing the elastic fibers and films of this invention. In this process, hydrogenation of the block copolymer is accomplished in the same solvent as was used during polymerization. The hydrogenation is accomplished in the presence of a catalyst comprising the reaction product of an aluminum alkyl and a nickel or cobalt carboxylate or alkoxide. In general, the hydrogenation is accomplished at a temperature within the range from about 25° C. to about 175° C. at a hydrogen partial pressure below about 5,000 psig and, usually, within the range from about 250 psig to about 1,500 psig. In general, contacting times within the range from about five minutes to about eight hours will be sufficient to permit the desired degree of hydrogenation.

While, as indicated supra, any elastomeric block copolymer comprising at least one polymeric block containing predominantly monoalkenyl aromatic hydrocarbon monomer units and at least one polymeric block containing predominantly conjugated diolefin units may be selectively hydrogenated and used in the preparation of the elastic fibers and films of this invention, lower molecular weight elastomeric block copolymers will, preferably, be used since this will ensure a lower viscosity of the blend used to prepare the elastomeric fibers and films. In this regard, and as is well known in the prior art, melt rheology of the polymeric composition used to prepare a fiber or film is a critical consideration in most, if not all, of the processes heretofore proposed for preparing such fibers and films. In a preferred embodiment of the present invention, then, the polymeric composition will comprise either a single A-B-A triblock, a blend of different A-B-A triblock copolymers, a blend of an A-B-A triblock copolymer and an A-B′ diblock copolymer or a blend of two or more different A-B-A triblock copolymers and one or more A-B′ diblock copolymers. The principal consideration in selecting a single A-B-A triblock copolymer, a blend of one or more A-B-A triblock copolymers, a blend of an A-B-A triblock copolymer and an A-B′ diblock copolymer or a blend of two or more different A-B-A triblock copolymers and one or more A-B′ diblock copolymers will be the apparent viscosity of the blend used to prepare the elastomeric fibers or films of this invention at the conditions employed in making said elastomeric fibers or films.

In a preferred embodiment, then, the blend used to prepare the elastomeric fiber or film will comprise:
(a) From about 0 to about 100 parts by weight of an A-B-A triblock copolymer wherein each A is a polymeric block containing predominantly monoalkenyl aromatic hydrocarbon monomer units having a weight-average molecular weight within the range from about 5,000 to about 9,000, more preferably a weight-average molecular weight within the range from about 7,000 to about 7,500 and most preferably a weight-average molecular weight of about 7,200; and wherein B is a polymeric block containing predominantly conjugated diolefin monomer units which have been hydrogenated so as to saturate at least about 80% of the ethylenic unsaturation in the polymer block after its preparation and more preferably such that at least 95% of the initial ethylenic unsaturation in the polymer block is saturated and having a weight-average molecular weight within the range from about 30,000 to about 50,000, more preferably a weight-average molecular weight within the range from about 33,000 to about 38,000 and most preferably having a weight-average molecular weight of about 35,000;
(b) From about 100 to about 0 parts, by weight, of a blend of an A-B-A triblock copolymer wherein A is a polymeric block containing predominantly monoalkenyl aromatic hydrocarbon monomer units having a weight-average molecular weight within the range from about 4,000 to about 7,000, more preferably having a weight-average molecular weight within the range from about 5,000 to about 6,000 and most preferably having a weight-average molecular weight of about 5,300; and wherein B is a polymeric block containing predominantly conjugated diolefin monomer units which have been hydrogenated such that at least about 80% of the ethylenic unsaturation contained in the polymer block after preparation is saturated and most preferably such that at least about 95% of the ethylenic unsaturation in the polymer block after preparation is saturated and having a weight-average molecular weight within the range from about 55,000 to about 90,000, more preferably having a weight-average molecular weight within the range from about 65,000 to about 80,000 and most preferably having a weight-average molecular weight of about 73,000; and an A-B′ diblock wherein A is a polymeric block containing predominantly monoalkenyl aromatic hydrocarbon monomer units having a weight-average molecular weight within the range from about 4,000 to about 9,000, more preferably a weight-average molecular weight within the range from about 5,000 to about 7,500 and most preferably a weight-average molecular weight of about 5,300 and wherein B′ is a polymeric block containing predominantly conjugated diolefin monomer units which are hydrogenated such that at least about 80% of the ethylenic unsaturation in the polymer block after preparation is saturated and most preferably such that at least about 95 wt % of the ethylenic unsaturation in the polymer block after preparation is saturated and having a weight-average molecular weight within the range from about 7,500 to about 67,500, more preferably, having a weight-average molecular weight within the range from about 8,250 to about 60,000 and most preferably having a weight-average molecular weight of about 36,500; said blend comprising from about 55 wt % to about 85 wt % of the A-B-A triblock copolymer and from about 45 wt % to about 15 wt % of the A-B′ diblock copolymer.

As indicated supra, the composition used to prepare the elastic fibers and films of this invention will also comprise from about 5 to about 50 parts, by weight, per 100 parts, by weight of combined block copolymer of a polymer selected from the group consisting of anionic homopolymers of styrene, homopolymers of α-methylstyrene, hydrogenated homopolymers of styrene and copolymers of α-methylstyrene and styrene. In general, this polymer will have a weight-average molecular weight within the range from about 1,000 to about 17,000. In a preferred embodiment, the composition used to prepare the elastic fiber or film of this invention will comprise from about 8 to about 35 parts, by weight, of the relatively low molecular weight polymer per 100 parts, by weight, of combined block copolymer and in a most preferred embodiment, the composition will contain from about 8 to about 20 parts, by weight, of the relatively low molecular weight polymer per 100 parts, by weight, of combined block copolymer. Also in a preferred embodiment, polymer selected from the group consisting of anionic homopolymers of styrene, homopolymers of alpha-methyl styrene, hydrogenated homopolymers of styrene and copolymers of alpha-methyl styrene and styrene will have a weight-average molecular weight within the range from about 1,900 to about 4,500. In a most preferred embodiment, the composition used to prepare the elastic fibers and films of this invention will comprise anionic polystyrene since this polymer, generally, results in a composition having the lowest viscosity, at least when compared to compositions containing one of the other low molecular weight polymers useful in the composition to make the elastic fiber or film of this invention.

The anionic polystyrene useful in the composition used to prepare the elastic fiber or film of this invention is, simply, a polystyrene prepared via anionic initiated polymerization. Anionic polymerization is, of course, well known in the prior art and such polymerization is taught, for example, in U.S. Pat. Nos. 3,135,716; 3,150,209; 3,496,154; 3,498,960; 4,145,298 and 3,238,202, the disclosure of which patents are herein incorporated by reference. Anionic polymerization is also taught in U.S. Pat. Nos. 3,231,635; 2,265,765 and 3,322,856. In general, anionic polymerization is accomplished by contacting the monomer, in this case styrene, with an organo alkali metal compound in a suitable solvent at a temperature within the range from about −150° C. to about 300° C. Particularly effective polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4. Surprisingly, the anionic polystyrene used in the composition to prepare the elastic fibers and films of this invention reduces the viscosity of the resulting composition significantly more than polystyrenes prepared via other polymerization techniques known in the prior art.

The relatively low molecular weight homopolymer of α-methylstyrene, the hydrogenated polystyrene and the α-methylstyrene-styrene copolymer useful in the composition to prepare the elastic fibers and films of this invention may all be prepared in accordance with any of the methods known in the prior art, including polymerization via anionic initiation. Such polymers are, of course, well known in the prior art. In general, the hydrogenated polystyrene will have at least about 80% and preferably at least about 95% of the aromatic unsaturation hydrogenated.

As also indicated supra, the composition used to prepare the elastic fibers and films of this invention will also comprise from about 0 to about 50 parts, by weight, per 100 parts, by weight, of combined block copolymer of a wax. In general, any of the paraffinic and/or microcrystalline waxes known in the prior art may be used in the composition to prepare the elastic fibers and films of this invention. A particularly preferred wax for use in the composition is available commercially under the trade name Shellwax 100.

As still further indicated supra, the composition used to prepare the elastic fibers and films of this invention may also contain other components such as fillers, extender oils, stabilizers, pigments, flow improver resins, tackifier resins, lubricants and the like. Suitable fillers include calcium carbonate, talc, barium sulfate, silica and the like. Suitable extender oils include any of the paraffinic and/or naphthenic oils known in the prior art to be useful as extender oils. A white, paraffinic, mineral oil is a particularly effective extender oil. Other oils that may, however, be used in the composition include commercially available oils such as Penreco 4434, a product of Pennzoil Corporation; Shellflex 371, available from Shell Oil Company; Tufflo 6056, available from Arco Chemical Company; Kaydol, available from Witco Chemical Company and the like. Suitable stabilizers include sterically hindered phenol-type anti-oxidants which may be used alone or in combination with various sulfur containing compounds such as thioesters, thiocarbamates and the like, titanium dioxide, zinc oxide and the like. Suitable pigments include titanium dioxide, carbon black and the like. Suitable flow improver resins include polypropylene and polyethylene resins, copolymers of vinyl toluene and α-methylstyrene and the like. Suitable tackifier resins include various hydrogenated petroleum hydrocarbon resins and the like. Suitable lubricants include aluminum stearate, barium stearate, calcium stearate, magnesium stearate, zinc stearate and the like. In general, these components, when used, will be used at concentrations well known in the prior art to impart the properties which each is well known to impart.

In general, any of the techniques known in the prior art for blending polymeric components either alone or in combination with other components such as the fillers, extender oils, stabilizers, pigments, lubricants and the like may be used to combine the various components used in the composition to form the elastic fibers and films of this invention. Suitable blending techniques, then, include solution blending, solid state physical admixture, molten state admixture, extrusion admixture, roll milling and the like. Moreover, any combination of these techniques may be used. Of these techniques, blending solutions of each of the components will, generally, produce the most uniform blend, however, mixing in the molten state with equipment such as Banbury mixers, Brabender mixers, extruders, roll mills and the like will, most often be more convenient. In general, molten phase admixture will be accomplished at temperatures within the range from about 140° C. to about 270° C. but higher and lower temperatures may in some cases at least, be operable.

After the composition useful in preparing the elastic fibers and films of this invention has been prepared, the same may then be shaped into fibers and then into nonwoven structures or films using any of the techniques well known in the prior art. Suitable methods for preparing the fiber, then, include spun-bonding, spun-lacing, melt spinning, melt blowing and the like. Similarly, the nonwoven structure may then be fashioned from the fiber using any of the techniques known to be useful in combination with the particular method selected in forming the fiber. Of these, melt blowing techniques are particularly preferred for forming the fiber and the nonwoven structure. Apparatus and methods for melt blowing the fiber and subsequently forming a nonwoven web are disclosed in such U.S. Patents as U.S. Pat. Nos. 3,755,527; 3,841,953; 3,849,241; 3,978,185 and 4,048,364, the disclosure of which patents are herein incorporated by reference.

PREFERRED EMBODIMENT

As indicated supra, in a preferred embodiment, the composition used to prepare the elastic fibers and films of this invention will comprise at least one A-B-A triblock copolymer and may optionally contain one or more diblock copolymers. In a more preferred embodiment, the composition used to prepare the elastic fiber and film will comprise two different A-B-A triblock copolymers and one A-B' diblock copolymer. In this more preferred embodiment, the first of the two A-B-A triblock copolymers will contain A polymer blocks having a weight-average molecular weight within the range from about 5,000 to about 9,000 and B polymer blocks having weight-average molecular weights within the range from about 30,000 to about 50,000. In this more preferred embodiment, the second of the A-B-A triblock copolymers will contain A blocks having a weight-average molecular weight within the range from about 4,000 to about 7,000 and B polymer blocks having a weight-average molecular weight within the range from about 55,000 to about 90,000. Also in this more preferred embodiment, the A-B' diblock will contain A polymer blocks having a weight-average molecular weight within the range from about 4,000 to about 9,000 and B' polymer blocks having a weight-average molecular weight within the range from about 7,500 to about 67,500. In an even more preferred embodiment, the first of the A-B-A triblocks will contain A polymer blocks having a weight-average molecular weight within the range from about 7,000 to about 7,500 and B polymer blocks having a weight-average molecular weight within the range from about 33,000 to about 38,000.

In this even more preferred embodiment, the second of the A-B-A triblock copolymers will contain A polymer blocks having a weight-average molecular weight within the range from about 5,000 to about 6,000 and B polymeric blocks having a weight-average molecular weight within the range from about 65,000 to about 80,000. Also, in this even more preferred embodiment, the A-B' diblock will contain A polymeric blocks having a weight-average molecular weight within the range from about 5,000 to abut 7,500 and B' polymeric blocks within the range from about 8,250 to about 60,000. In each of these more preferred embodiments, the block copolymer blend in the composition used to prepare the elastic fiber or film of this invention will comprise from about 50 wt % to about 90 wt % of the first of the A-B-A triblock copolymers and from 10 wt % to about 50 wt % of a mixture consisting of from about 65 wt % to about 75 wt % of the second A-B-A triblock and from about 35 wt % to about 25 wt % of the A-B' diblock. In a most preferred embodiment, from about 50 wt % to about 90 wt % of the total block copolymer used in the composition will be a first A-B-A triblock copolymer wherein A is a polystyrene block having a weight-average molecular weight of about 7,200 and B is a hydrogenated polybutadiene block having a weight-average molecular weight of 35,000 and from about 50 wt % to about 10 wt % of a block copolymer blend comprising from about 65 wt % to about 75 wt % of a second A-B-A triblock copolymer wherein A is a polystyrene block having a weight-average molecular weight of about 5,300 and B is a hydrogenated polybutadiene block having a weight-average molecular weight of about 73,000 and from about 35 wt % to about 25 wt % of an A-B' diblock copolymer wherein A is a polystyrene block having a molecular weight of about 5,300 and B' is a hydrogenated polybutadiene block having a molecular weight of about 36,500. Also in the preferred and more preferred embodiments, the composition used to prepare the elastic fiber or film will contain from about 8 parts to about 35 parts, by weight, per 100 parts, by weight, of combined block copolymer of a low molecular weight anionic polystyrene and most preferably the composition will comprise from about 8 parts to about 20 parts, by weight, per 100 parts, by weight, of combined block copolymer of a low molecular polystyrene. In the preferred, more preferred and most preferred embodiments, the composition will contain an anionic polystyrene having a weight-average molecular weight within the range from about 1,900 to about 4,500. Also in a preferred embodiment, the composition used to prepare the elastic fiber or film will contain from about 0 parts to about 10 parts, by weight, per 100 parts, by weight, of combined block copolymer and most preferably the composition will contain from about 0 parts to about 5 parts, by weight, per 100 parts, by weight, of combined block copolymer of a wax.

Having thus broadly described the present invention and a preferred and most preferred embodiment thereof, it is believed that the same will become even more apparent by reference to the following examples. It will be appreciated, however, that the examples are presented solely for purposes of illustration and should not be construed as limiting the invention.

EXAMPLE 1

In this example, a composition which would be useful in the preparation of an elastic fiber was prepared. The composition contained 70 wt % of an A-B-A triblock copolymer wherein A was a polystyrene block having a weight-average molecular weight of about 5,300 and B was a hydrogenated conjugated diolefin block having a weight-average molecular weight of 73,000 and 30% of a A-B' diblock copolymer wherein A was a polystyrene block having a weight-average molecular weight of about 5,300 and B' was a hydrogenated polybutadiene block having a weight-average molecular weight of about 36,500. The composition also contained 30 parts, by weight, per 100 parts of combined block copolymer of an anionic polystyrene having a weight-average molecular weight of 4,500. The composition also contained 40 parts, by weight, per 100 parts of combined block copolymer of a Shellwax 100 wax. The composition was prepared by admixing the components in the molten phase using a Brabender mixer. After preparation of the composition, its viscosity, in poise, was determined at 3,500 sec$^{-1}$ and 450° F. After the composition was allowed to cure, various properties were then determined. The actual properties determined and the results obtained are summarized in the following Table:

TABLE

| Physical Properties | Value |
|---|---|
| Viscosity, 3500 sec$^{-1}$, 450° F., poise | 75 |
| Stress relaxatoon after 5 extension cycles, % | 17 |
| Set after 5 extension cycles, % | 20 |
| Hysteresis Loss, % | 43 |
| Dynamic Hysteresis, % | 19 |
| Set, % | 42 |
| Tensile Strength, psi | 605 |
| Elongation, % | 590 |
| Hardness, Shore A, 10 sec. | 66 |

As will be apparent from the data summarized in the preceding Table, the viscosity of 75 poise is well within that required for the formation of a fiber via melt blowing techniques. As will also be apparent from the data summarized in the preceding Table, one would expect such a fiber to exhibit reasonably good physical properties.

EXAMPLE 2

In this example, a composition suitable for use in forming elastic fibers or films was prepared. The composition contained a block copolymer blend comprising 33 wt % of an A-B-A triblock copolymer wherein A was a polystyrene block having a weight-average molecular weight of 7,200 and B was a hydrogenated polybutadiene block having a weight-average molecular weight of about 35,000, about 46 wt % of an A-B-A triblock copolymer wherein A was a polystyrene block having a weight-average molecular weight of about 5,300 and B was a hydrogenated polybutadiene block having a weight-average molecular weight of about 73,000 and about 17 wt % of an A-B' diblock wherein A was a polystyrene block having a weight-average molecular weight of about 5,300 and B' was a hydrogenated polybutadiene block having a weight-average molecular weight of 36,500. The composition also contained 10 parts of an anionic polystyrene having a weight-average molecular weight of about 1,900 per 100 parts, by weight, of combined block copolymer, 10 parts, by weight, of a paraffinic wax having a melting point of about 124° F. (Shellwax 100) per 100 parts, by weight, of combined block copolymer and 50 parts, by weight, of an extender oil per 100 parts, by weight, of combined block copolymer. The composition also contained a minor amount of a stabilizer, colorant and lubricant. After preparation, the same physical properties were determined as were determined on the composition prepared in Example 1. These physical properties and the results obtained are summarized in the following Table:

TABLE

| Physical Properties | Value |
| --- | --- |
| Viscosity, 3500 sec$^{-1}$, 450° F., poise | 157 |
| Stress relaxation after 5 extension cycles, % | 13 |
| Set after 5 extension cycles, % | 7 |
| Hysteresis Loss, % | 23 |
| Dynamic Hysteresis, % | 9 |
| Set, % | 21 |
| Tensile Strength, psi | 275 |
| Elongation, % | 610 |
| Hardness, Shore A, 10 sec. | 30 |

As will be apparent from the data summarized in the preceding Table, the viscosity of the composition prepared in this example, while higher than that of the composition prepared in Example 1, remains well within the requirements for the satisfactory production of a fiber via melt blowing. As will also be apparent from the data summarized in the preceding Table, one would again expect a fiber thus produced to exhibit good physical properties.

EXAMPLE 3

In this example, a composition suitable for use in the preparation of elastic fibers and films via melt blowing was prepared. The composition contained an A-B-A triblock copolymer wherein A was a polystyrene block having a weight-average molecular weight of about 7,200 and B was a polybutaiene block, which was hydrogenated after preparation of the block copolymer having a weight-average molecular weight before hydrogenation of about 35,000. The composition also contained 10 parts, by weight, per 100 parts, by weight, of block copolymer of an anionic polystyrene having a weight-average molecular weight of 4,500, 10 parts, by weight, per 100 parts, by weight, of block copolymer of a polyethylene wax, 10 parts, by weight, per 100 parts, by weight, of block copolymer of a paraffinic wax having a melting point of about 124° F. (Shellwax 100) and 75 parts, per 100 parts, by weight, of an extender oil. After preparation, the same physical properties as were determined in Examples 1 and 2 were determined for the composition prepared in this example. The physical properties actually measured and the results obtained are summarized in the following Table:

TABLE

| Physical Properties | Value |
| --- | --- |
| Viscosity, 3500 sec$^{-1}$, 450° F., poise | 48 |
| Stress relaxation after 5 extension cycles, % | 10 |
| Set after 5 extension cycles, % | 11 |
| Hysteresis Loss, % | 24 |
| Dynamic Hysteresis, % | 13 |
| Set, % | 17 |
| Tensile Strength, psi | 280 |
| Elongation, % | 475 |
| Hardness, Shore A, 10 sec. | 35 |

As will be apparent from the data summarized in the preceding table, the block copolymer composition comprising an A-B-A triblock copolymer provided a composition having a viscosity well below that of the composition prepared in Examples 1 and 2. As will also be apparent from the data summarized in the preceding Table, one would again expect a fiber prepared from the composition to exhibit good physical properties.

EXAMPLE 4

In this example, a composition suitable for use in forming elastic fibers or films was prepared. The composition contained a block copolymer blend comprising 67 wt % of an A-B-A triblock copolymer wherein A was a polystyrene block having a weight-average molecular weight of 7,200 and B was a hydrogenated polybutadiene block having a weight-average molecular weight of about 35,000, about 23 wt % of an A-B-A triblock copolymer wherein A was a polystyrene block having a weight-average molecular weight of about 5,300 and B was a hydrogenated polybutadiene block having a weight-average molecular weight of about 73,000 and about 10 wt % of an A-B' diblock wherein A was a polystyrene block having a weight-average molecular weight of about 5,300 and B' was a hydrogenated polybutadiene block having a weight-average molecular weight of 36,500. The composition also contained 14 parts of a copolymer of α-methylstyrene and styrene per 100 parts, by weight, of combined block copolymer, 7 parts, by weight, of a low viscosity polyethylene per 100 parts, by weight, of combined block copolymer, 14 parts, by weight, per 100 parts, by weight, of total block copolymer of a hydrogenated hydrocarbon resin and 24 parts, by weight, of an extender oil per 100 parts, by weight, of combined block copolymer. The composition also contained a minor amount of a stabilizer, colorant and lubricant. After preparation, the same physical properties were determined as were determined on the composition prepared in Example 1. These physical properties and the results obtained are summarized in the following Table:

TABLE

| Physical Properties | Value |
| --- | --- |
| Viscosity, 3500 sec$^{-1}$, 450° F., poise | 580 |

TABLE-continued

| Physical Properties | Value |
|---|---|
| Stress relaxation after 5 extension cycles, % | 6 |
| Set after 5 extension cycles, % | 10 |
| Hysteresis Loss, % | 15 |
| Dynamic Hysteresis, % | 6 |
| Set, % | 8 |
| Tensile Strength, psi | 1,315 |
| Elongation, % | 700 |
| Hardness, Shore A, 10 sec. | 54 |

As will be apparent from the data summarized in the preceding Table, the viscosity of the composition prepared in this example, while higher than that of the composition prepared in Example 1, remains well within the requirements for the satisfactory production of a fiber via melt blowing. As will also be apparent from the data summarized in the preceding Table, one would again expect a fiber thus produced to exhibit good physical properties.

EXAMPLE 5

In this example, a composition suitable for use in forming elastic fibers or films was prepared. The composition contained a block copolymer blend comprising 67 wt % of an A-B-A triblock copolymer wherein A was a polystyrene block having a weight-average molecular weight of 7,200 and B was a polybutadiene block having a weight-average molecular weight of about 35,000, about 23 wt % of an A-B-A triblock copolymer wherein A was a polystyrene block having a weight-average molecular weight of about 5,300 and B was a polybutadiene block having a weight-average molecular weight of about 73,000 and about 10 wt % of an A-B' diblock wherein A was a polystyrene block having a weight-average molecular weight of about 5,300 and B' was a polybutadiene block having a weight-average molecular weight of 36,500. The composition also contained 12 parts of a copolymer of α-methylstyrene and styrene per 100 parts, by weight, of combined block copolymer, 8 parts, by weight, of a low viscosity polyethylene per 100 parts, by weight, of combined block copolymer, 16 parts, by weight, per 100 parts, by weight, of combined block copolymer of a low molecular weight hydrocarbon resin and 14 parts, by weight, of an extender oil per 100 parts, by weight, of combined block copolymer. The composition also contained a minor amount of a stabilizer, colorant and lubricant. After preparation, the same physical properties were determined as were determined on the composition prepared in Example 1. These physical properties and the results obtained are summarized in the following Table:

TABLE

| Physical Properties | Value |
|---|---|
| Viscosity, 3500 sec$^{-1}$, 450° F., poise | 670 |
| Stress relaxation after 5 extension cycles, % | 10 |
| Set after 5 extension cycles, % | 5 |
| Hysteresis Loss, % | 21 |
| Dynamic Hysteresis, % | 8 |
| Set, % | 11 |
| Tensile Strength, psi | 1,990 |
| Elongation, % | 700 |
| Hardness, Shore A, 10 sec. | 60 |

As will be apparent from the data summarized in the preceding Table, the viscosity of the composition prepared in this example, while higher than that of the composition prepared in Example 1, remains well within the requirements for the satisfactory production of a fiber via melt blowing. As will also be apparent from the data summarized in the preceding Table, one would again expect a fiber thus produced to exhibit good physical properties.

While the present invention has been described and illustrated by reference to particular embodiments thereof, it will be appreciated by those of ordinary skill in the art that the same lends itself to variations not necessarily described or illustrated herein. For this reason, then, reference should be made solely to the appended claims for purposes of determining the true scope of the invention.

Having thus described and illustrated the invention, what is claimed is:

1. An elastomeric fiber comprising at least one block copolymer comprising at least two polymeric blocks containing predominantly monoalkenyl aromatic hydrocarbon monomer units having a weight-average molecular weight within the range from about 4,000 to about 50,000 and at least one polymeric block containing predominantly conjugated diolefin monomer units which have been hydrogenated so as to saturate at least about 80% of the ethylenic unsaturation in the polymer block after its preparation and having a weight-average molecular weight within the range from about 10,000 to about 200,000, from about 5 parts to about 50 parts, by weight, per 100 parts, by weight, of block copolymer of a polymer selected from the Group consisting of homopolymers of anionic polystyrene, homopolymers of α-methylstyrene, hydrogenated polystyrene, and copolymers of α-methylstyrene and styrene, said polymer selected from said group having a weight-average molecular weight within the range from about 1,000 to about 17,000 and from about 0 parts to about 50 parts, by weight, per 100 parts, by weight, of combined block copolymer of a parraffinic and/or microcrystalline wax.

2. The elastomeric fiber of claim 1 wherein said polymeric blocks containing predominantly monoalkenyl aromatic hydrocarbon monomer units have a weight-average molecular weight within the range from about 5,000 to about 9,000 and said polymeric blocks containing predominantly conjugated diolefin monomer units have a weight-average molecular weight within the range from about 30,000 to about 50,000.

3. The elastomeric fiber of claim 1 wherein said polymeric blocks containing predominantly monoalkenyl aromatic hydrocarbon monomer units have a weight-average molecular weight within the range from about 7,000 to about 7,500 and said polymeric blocks containing predominantly conjugated diolefin monomer units have a molecular weight within the range from about 33,000 to about 38,000.

4. The elastomeric fiber of claim 1 wherein said polymeric blocks containing predominantly monoalkenyl aromatic hydrocarbon monomer units have a molecular weight of about 7,200 and said polymeric blocks containing predominantly conjugated diolefin monomer units have a molecular weight of about 35,000.

5. The elastomeric fiber of claim 4 wherein said monoalkenyl aromatic hydrocarbon monomer is styrene and said conjugated diolefin monomer is butadiene.

6. An elastomeric fiber comprising at least one A-B-A triblock copolymer wherein A is a polymeric block containing predominantly monoalkenyl aromatic hydrocarbon units having a weight-average molecular weight within the range from about 4,000 to about 50,000 and B is a polymeric block containing predominantly conjugated diolefin monomer units which have been hydrogenated so as to saturate at least about 80% of the ethylenic unsaturation in the polymer block after its preparation and having a weight-average molecular weight within the range from about 10,000 to about 200,000, and A-B' diblock copolymer wherein A is a polymeric block containing predominantly monoalkenyl aromatic hydrocarbon monomer units having a weight-average molecular weight within the range from about 4,000 to about 50,000 and B' is a polymeric block containing predominantly conjugated diolefin monomer units which have been hydrogenated so as to saturate at least about 80% of the ethylenic unsaturation in the polymer block after its preparation and having a weight-average molecular weight within the range from about 2,500 to about 150,000, from about 5 parts to about 50 parts, by weight, per 100 parts, by weight, of combined block copolymer of a polymer selected from the group consisting of anionic polystyrene, α-methylstyrene homopolymers, hydrogenated polystyrene (styrene), copolymers of α-methylstyrene and styrene and mixtures thereof, said polymer selected from said group having a weight-average molecular weight within the range from about 1,000 to about 17,000 and from about 0 parts to about 50 parts, by weight, per 100 parts, by weight, combined block copolymer of a paraffinic and/or microcrystalline wax.

7. The elastomeric fiber of claim 6 wherein said fiber comprises two A-B-A triblock copolymers, the first A-B-A triblock copolymer having A polymer blocks with a number average molecular weight within the range from about 5,000 to about 9,000 and B polymeric blocks having a weight average molecular weight within the range from about 30,000 to about 50,000, the second A-B-A triblock copolymer having A polymeric blocks with weight-average molecular weights within the range from about 4,000 to about 7,000 and B polymeric blocks having a weight-average molecular weight within the range from about 55,000 to about 90,000, and wherein said A-B' diblock copolymer has A polymeric blocks having weight-average molecular weights within the range from about 4,000 to about 9,000 and B' polymeric blocks having a weight-average molecular weight within the range from about 7,500 to about 67,500.

8. The elastomeric fiber of claim 7 wherein said first A-B-A triblock copolymer has A polymeric blocks having a weight-average molecular weight within the range from about 7,000 to about 7,500 and B polymeric blocks having a weight-average molecular weight within the range from about 33,000 to about 38,000, and said second A-B-A triblock copolymer has A polymeric blocks with a weight-average molecular weight within the range from about 5,000 to about 6,000 and B polymeric blocks having a weight-average molecular weight within the range from about 65,000 to about 80,000, and wherein said A-B' diblock copolymer has A polymeric blocks having weight-average molecular weights within the range from about 5,000 to about 7,500 and said B' polymeric blocks having a weight-average molecular weight within the range from about 8,250 to about 60,000.

9. The elastomeric fiber of claim 7 wherein said first A-B-A triblock copolymer has A polymeric blocks having a weight-average molecular weight of about 7,200 and B polymeric blocks having a weight-average molecular weight of about 35,000 and second A-B-A triblock copolymer having A polymeric blocks with a weight-average molecular weight of about 5,300 and B polymeric blocks having a weight-average molecular weight of about 73,000, and wherein said A-B' diblock copolymer has A polymeric blocks having a weight-average molecular weight of about 5,300 and B' polymeric blocks having a weight-average molecular weight of about 36,500.

10. The elastomeric fiber of claim 9 wherein said monoalkenyl aromatic hydrocarbon monomer is styrene and said conjugated diolefin monomer is butadiene.

11. The elastomeric fiber of claim 10 wherein said polymer selected from said group is present at a concentration within the range from about 8 parts to about 35 parts, by weight, per 100 parts, by weight, of combined block copolymer and said wax is present at a concentration within the range from about 0 parts to about 10 parts, by weight, per 100 parts, by weight, combined block copolymer.

12. The elastomeric fiber of claim 10 wherein said polymer selected from said group is present at a concentration within the range from about 8 parts to about 20 parts, by weight, per 100 parts, by weight, combined block copolymer and said wax is present at a concentration within the range from about 0 parts to about 5 parts, by weight, per 100 parts, by weight, combined block copolymer.

13. The elastomeric fiber of claim 12 wherein said polymer selected from said group is an anionic polystyrene.

14. The elastomeric fiber of claim 13 wherein said anionic polystyrene has a weight-average molecular weight within the range from about 1,900 to about 4,500.

15. A nonwoven structure prepared with an elastomeric fiber comprising at least one block copolymer comprising at least two polymeric blocks containing predominantly monoalkenyl aromatic hydrocarbon monomer units having a weight-average molecular weight within the range from about 4,000 to about 50,000 and at least one polymeric block containing predominantly conjugated diolefin monomer units which have been hydrogenated so as to saturate at least about 80% of the ethylenic unsaturation in the polymer block after its preparation and having a weight-average molecular weight within the range from about 10,000 to about 200,000, from about 5 parts to about 50 parts, by weight, per 100 parts, by weight, of block copolymer of a polymer selected from the Group consisting of anionic polystyrene, homopolymers of α-methylstyrene, hydrogenated polystyrene, and copolymers of α-methylstyrene and styrene, said polymer selected from said group having a weight-average molecular weight within the range from about 1,000 to about 17,000 and from about 0 parts to about 50 parts, by weight, per 100 parts, by weight, of combined block copolymer of a paraffinic and/or microcrystalline wax.

16. The nonwoven structure of claim 15 wherein said polymeric blocks containing predominantly monoalkenyl aromatic hydrocarbon monomer units have a weight-average molecular weight within the range from about 5,000 to about 9,000 and said polymeric blocks containing predominantly conjugated diolefin monomer units have a weight-average molecular weight within the range from about 30,000 to about 50,000.

17. The nonwoven structure of claim 15 wherein said polymeric blocks containing predominantly monoalkenyl aromatic hydrocarbon monomer units have a weight-average molecular weight within the range from about 7,000 to about 7,500 and said polymeric blocks containing predominantly conjugated diolefin monomer units have a molecular weight within the range from about 33,000 to about 38,000.

18. The nonwoven structure of claim 15 wherein said polymeric blocks containing predominantly monoalkenyl aromatic hydrocarbon monomer units have a molecular weight of about 7,200 and said polymeric blocks containing predominantly conjugated diolefin monomer units have a molecular weight of about 35,000.

19. The nonwoven structure of claim 18 wherein said monoalkenyl aromatic hydrocarbon monomer is styrene and said conjugated diolefin monomer is butadiene.

20. A nonwoven structure prepared with an elastomeric fiber comprising at least one A-B-A triblock copolymer wherein A is a polymeric block containing predominantly monoalkenyl aromatic hydrocarbon units having a weight-average molecular weight within the range from about 4,000 to about 50,000 and B is a polymeric block containing predominantly conjugated diolefin monomer units which have been hydrogenated so as to saturate at least about 80% of the ethylenic unsaturation in the polymer block after its preparation and having a weight-average molecular weight within the range from about 10,000 to about 200,000, and A-B′ diblock wherein A is a polymeric block containing predominantly monoalkenyl aromatic hydrocarbon monomer units having a weight-average molecular weight within the range from about 4,000 to about 50,000 and B′ is a polymeric block containing predominantly conjugated diolefin monomer units which have been hydrogenated so as to saturate at least about 80% of the ethylenic unsaturation in the polymer block after its preparation and having a weight-average molecular weight within the range from about 2,500 to about 150,000, from about 5 parts to about 50 parts, by weight, per 100 parts, by weight, of combined block copolymer of a polymer selected from the group consisting of anionic styrene homopolymers, α-methylstyrene homopolymers, hydrogenated polystyrene, copolymers of α-methylstyrene and styrene and mixtures thereof, said polymer selected from said group having a weight-average molecular weight within the range from about 1,000 to about 17,000 and from about 0 parts to about 50 parts, by weight, per 100 parts, by weight, combined block copolymer of a paraffinic and/or microcrystalline wax.

21. The nonwoven structure of claim 20 wherein said elastomeric fiber comprises two A-B-A triblock copolymers, the first A-B-A triblock copolymer having A polymeric blocks with a number average molecular weight within the range from about 5,000 to about 9,000 and B polymeric blocks having a weight-average molecular weight within the range from about 30,000 to about 50,000, the second A-B-A triblock copolymer having A polymeric blocks with weight-average molecular weights within the range from about 4,000 to about 7,000 and B polymeric blocks having a weight-average molecular weight within the range from about 55,000 to about 90,000, and wherein said A-B′ diblock copolymer has A polymeric blocks having weight-average molecular weights within the range from about 4,000 to about 9,000 and B′ polymeric blocks having a weight-average molecular weight within the range from about 8,500 to about 67,500.

22. The nonwoven structure of claim 21 wherein said first A-B-A triblock copolymer has A polymeric blocks having a weight-average molecular weight within the range from about 7,000 to about 7,500 and B polymeric blocks having a weight-average molecular weight within the range from about 33,000 to about 38,000, and said second A-B-A triblock copolymer has A polymeric blocks with a weight-average molecular weight within the range from about 5,000 to about 6,000 and B polymeric blocks having a weight-average molecular weight within the range from about 65,000 to about 80,000, and wherein said A-B′ diblock copolymer has A polymeric blocks having weight-average molecular weights within the range from about 5,000 to about 7,500 and said B′ polymeric blocks having a weight-average molecular weight within the range from about 8,250 to about 60,000.

23. The nonwoven structure of claim 21 wherein said first A-B-A triblock copolymer has A polymeric blocks having a weight-average molecular weight of about 7,200 and B polymeric blocks having a weight-average molecular weight of about 35,000 and second A-B-A triblock copolymer having A polymeric blocks with a weight-average molecular weight of about 5,300 and B polymeric blocks having a weight-average molecular weight of about 73,000, and wherein said A-B′ diblock copolymer has A polymeric blocks having a weight-average molecular weight of about 5,300 and B′ polymeric blocks having a weight-average molecular weight of about 36,500.

24. The nonwoven structure of claim 23 wherein said monoalkenyl aromatic hydrocarbon monomer is styrene and said conjugated diolefin monomer is butadiene.

25. The nonwoven structure of claim 24 wherein said polymer selected from said group is present at a concentration within the range from about 8 parts to about 35 parts, by weight, per 100 parts, by weight, of combined block copolymer and said wax is present at a concentration within the range from about 0 parts to about 10 parts, by weight, per 100 parts, by weight, combined block copolymer.

26. The nonwoven structure of claim 24 wherein said polymer selected from said group is present at a concentration within the range from about 8 parts to about 20 parts, by weight, per 100 parts, by weight, combined block copolymer and said wax is present at a concentration within the range from about 0 parts to about 5 parts, by weight, per 100 parts, by weight, combined block copolymer.

27. The nonwoven structure of claim 26 wherein said polymer selected from said group is an anionic polystyrene.

28. The nonwoven structure of claim 27 wherein said anionic polystyrene has a weight-average molecular weight within the range from about 1,900 to about 4,500.

29. An elastomeric film comprising at least one block copolymer comprising at least two polymeric blocks containing predominantly monoalkenyl aromatic hydrocarbon monomer units having a weight-average molecular weight within the range from about 4,000 to about 50,000 and at least one polymeric block containing predominantly conjugated diolefin monomer units which have been hydrogenated so as to saturate at least about 80% of the ethylenic unsaturation in the polymer block after its preparation and having a weight-average molecular weight within the range from about 10,000 to about 200,000, from about 5 parts to about 50 parts, by weight, per 100 parts, by weight, of block copolymer of a polymer selected from the Group consisting of homopolymers of anionic styrene, homopolymers of α-methylstyrene, hydrogenated polystyrene, and copolymers of α-methylstyrene and styrene, said polymer selected from said group having a weight-average molecular weight within the range from about 1,000 to about 17,000 and from about 0 parts to about 50 parts, by weight, per 100 parts, by weight, of block copolymer of a paraffinic and/or microcrystalline wax.

30. The elastomeric film of claim 29 wherein said polymeric blocks containing predominantly monoalkenyl aromatic hydrocarbon monomer units have a weight-average molecular weight within the range from about 5,000 to about 9,000 and said polymeric blocks containing predominantly conjugated diolefin monomer units have a weight-average molecular weight within the range from about 30,000 to about 50,000.

31. The elastomeric film of claim 29 wherein said polymeric blocks containing predominantly monoalkenyl aromatic hydrocarbon monomer units have a weight-average molecular weight within the range from about 7,000 to about 7,500 and said polymeric blocks containing predominantly conjugated diolefin monomer units have a molecular weight within the range from about 33,000 to about 38,000.

32. The elastomeric film of claim 29 wherein said polymeric blocks containing predominantly monoalkenyl aromatic hydrocarbon monomer units have a molecular weight of about 7,200 and said polymeric blocks containing predominantly conjugated diolefin monomer units have a molecular weight of about 35,000.

33. The elastomeric film of claim 32 wherein said monoalkenyl aromatic hydrocarbon monomer is styrene and said conjugated diolefin monomer is butadiene.

34. An elastomeric film comprising at least one A-B-A triblock ocpolymer wherein A is a polymeric block containign predominantly monoalkenyl aromatic hydrocarbon units having a weight-average molecular weight within the range from about 4,000 to about 50,000 and B is a polymeric block containing predominantly conjugated diolefin monomer units which have been hydrogenated so as to saturate at least about 80% of the ethylenic unsaturation in the polymer block after its preparation and having a weight-average molecular weight within the range from about 10,000 to about 200,000, an A-B' diblock copolymer wherein A is a polymeric block containing predominantly monoalkenyl aromatic hydrocarbon monomer units having a weight-average molecular weight within the range from about 4,000 to about 50,000 and B' is a polymeric block containing predominantly conjugated diolefin monomer units which have been hydrogenated so as to saturate at least about 80% of the ethylenic unsaturation in the polymer block after its preparation and having a weight-average molecular weight within the range from about 2,500 to about 150,000, from about 5 parts to about 50 parts, by weight, per 100 parts, by weight, of combined block copolymer of a polymer selected from the group consisting of anionic styrene homopolymers, α-methylstyrene homopolymers, hydrogenated polystyrene, copolymers of α-methylstyrene and styrene and mixtures thereof, said polymer selected from said group having a weight-average molecular weight within the range from about 1,000 to about 17,000 and from about 0 parts to about 50 parts, by weight, per 100 parts, by weight, combined block copolymer of a paraffinic and/or microcrystalline wax.

35. The elastomeric film of claim 34 wherein said elastomeric film comprises two A-B-A triblock copolymers, the first A-B-A triblock copolymer having A polymeric blocks with a number average molecular weight within the range from about 5,000 to about 9,000 and B polymeric blocks having a weight-average molecular weight within the range from about 30,000 to about 50,000, the second A-B-A triblock copolymer having A polymeric blocks with weight-average molecular weights within the range from about 4,000 to about 7,000 and B polymeric blocks having a weight-average molecular weight within the range from about 55,000 to about 90,000, and wherein said A-B' diblock copolymer has A polymeric blocks having weight-average molecular weights within the range from about 4,000 to about 9,000 and B' polymeric blocks having a weight-average molecular weight within the range from about 7,500 to about 67,500.

36. The elastomeric film of claim 35 wherein said first A-B-A triblock copolymer has A polymeric blocks having a weight-average molecular weight within the range from about 7,000 to about 7,500 and B polymeric blocks having a weight-average molecular weight within the range from about 33,000 to about 38,000, and said second A-B-A triblock copolymer has A polymeric blocks with a weight-average molecular weight within the range from about 5,000 to about 6,000 and B polymeric blocks having a weight-average molecular weight within the range from about 65,000 to about 80,000, and wherein said A-B' diblock copolymer has A polymeric blocks having weight-average molecular weights within the range from about 5,000 to about 7,500 and said B' polymeric blocks having a weight-average molecular weight within the range from about 8,250 to about 60,000.

37. The elastomeric film of claim 35 wherein said first A-B-A triblock copolymer has A polymeric blocks having a weight-average molecular weight of about 7,200 and B polymeric blocks having a weight-average molecular weight of about 35,000 and second A-B-A triblock copolymer having A polymeric blocks with a weight-average molecular weight of about 5,300 and B polymeric blocks having a weight-average molecular weight of about 73,000, and wherein said A-B' diblock copolymer has A polymeric blocks having a weight-average molecular weight of about 5,300 and B' polymeric blocks having a weight-average molecular weight of about 36,500.

38. The elastomeric film of claim 37 wherein said monoalkenyl aromatic hydrocarbon monomer is styrene and said conjugated diolefin monomer is butadiene.

39. The elastomeric film of claim 38 wherein said relatively low molecular weight polymer is present at a concentration within the range from about 8 parts to about 35 parts, by weight, per 100 parts, by weight, of combined block copolymer and said wax is present at a concentration within the range from about 0 parts to about 10 parts, by weight, per 100 parts, by weight, combined block copolymer.

40. The elastomeric film of claim 38 wherein said polymer selected from said group is present at a concentration within the range from about 8 parts to about 20 parts, by weight, per 100 parts, by weight, combined block copolymer and said wax is present at a concentration within the range 0 parts to about 5 parts, by weight, per 100 parts, by weight, combined block copolymer.

41. The elastomeric film of claim 40 wherein said polymer selected from said group is an anionic polystyrene.

42. The elastomeric film of claim 41 wherein said anionic polystyrene has a weight-average molecular weight within the range from about 1,900 to about 4,500.

43. The elastomeric fiber of claim 1 wherein the blocks containing predominantly conjugated diolefin monomer units have been hydrogenated so as to saturate at least about 95% of the initial ethylenic unsaturation in the polymer.

44. The elastomeric fiber of claim 6 wherein the polymeric blocks containing predominantly conjugated diolefin monomer units have been hydrogenated so as to saturate at least about 95% of the ethylenic unsaturation in the polymer block after its preparation.

45. The non-woven structure of claim 15 wherein the polymeric blocks containing predominantly conjugated diolefin monomer units have been hydrogenated so as to saturate at least 95% of the ethylenic unsaturation in the polymer blocks after their preparation.

46. The elastomeric film of claim 29 wherein the polymeric blocks containing predominantly conjugated diolefin monomer units have been hydrogenated so as to saturate at least 95% of the ethylenic unsaturation contained in these blocks after their preparation.

47. The elastomeric film of claim 34 wherein the polymeric blocks containing predominantly conjugated diolefin monomer units have been hydrogenated so as to saturate at least 95% of the ethylenic unsaturation contained in these blocks after their preparation.

* * * * *